United States Patent [19]

Deeks

[11] 4,192,741

[45] Mar. 11, 1980

[54] PROCESS FOR TREATING SEWAGE EFFLUENT

[75] Inventor: Daniel H. Deeks, 231 Franklin Ave., Sea Cliff, N.Y. 11579

[73] Assignee: Daniel H. Deeks, Sea Cliff, N.Y.

[21] Appl. No.: 956,242

[22] Filed: Dec. 27, 1978

Related U.S. Application Data

[63] Continuation-in-part of Ser. No. 817,448, Aug. 25, 1977, abandoned.

[51] Int. Cl.$^2$ .............................................. C02G 1/04
[52] U.S. Cl. ............................................ 210/6; 210/16
[58] Field of Search ................... 210/14, 16, 71, 170, 210/3-7, 18, 17

[56] References Cited

U.S. PATENT DOCUMENTS

| | | | |
|---|---|---|---|
| 3,607,735 | 9/1971 | Hover et al. | 210/14 |
| 3,741,890 | 6/1973 | Smith et al. | 210/71 |
| 3,900,394 | 8/1975 | Rongred | 210/14 |
| 3,981,800 | 9/1976 | Ort | 210/16 |

*Primary Examiner*—Thomas G. Wyse

[57] ABSTRACT

The process described herein calls for reaction of the effluent as it flows through the plant. The use of high and low pressure venturies (Barnoulli's equation) are included in this design.

The purpose of this high pressure venturi (wider reaction pipe) is to create a high pressure and temperature for the bacteria to live in. It also serves to slow the effluent down for a longer detention time and longer period of organic or inorganic reaction. This results, in the case of the sludge, that the flow speed is equal to the rate at which the bacteria consume their way toward the incoming sludge flow. This above mentioned flow produces points of maximum organic or inorganic reaction: (i.e. bacterial or combustions of various natures) at constant designated points in the venturi. This design has the capacity to produce a high quality natural gas.

1 Claim, No Drawings

PROCESS FOR TREATING SEWAGE EFFLUENT

This application is a continuation-in-part of Ser. No. 817,448, filed Aug. 25, 1977, now abandoned.

BACKGROUND OF THE INVENTION

Sewage and/or sludge treatment plants, that produce combustible gases, in use and in design before this invention, call for the use of holding or reacting tanks, or "long pipeline reactors." For the most part the installation, use and maintenance of these systems is unfit for those municipalities, counties and states with limited fiscal means. For example, the long pipeline reactor calls for over one and one half miles of reactor pipe; the holding or reacting tanks that measure thirty by sixty by four hundred feet in size and vacuum molded in a single piece. Neither one is an inexpensive proposition.

The linear flow treatment plant that produces combustible gases as described below consists of a series of mass produced individually molded venturi tubes: with both sides (inside and out) vacuum dried. These venturi tubes are used to create areas of high and low pressure as the sewage and/or sludge flow through the venturi under the influence of high and low pressure pumps. The low pressure areas are used to cause the dissolved gases in the effluent to be liberated from the effluent. The high pressure areas are used to dissolve gases, fluids and/or solids into the effluent. Each of these said areas are used to increase bacterial digestion, as well as the natural breakdown of the sewage and/or sludge. Thus the need for costly tanks or long reactor pipes is eliminated.

SUMMARY OF THE INVENTION

In this process, after the untreated effluent passes through a grit chamber, it then passes through a high speed drum separator. This serves to separate the sludge from the sewage. The sludge then has a muddy consistancy, for it has been partially dewatered. The result of this is that there are two very different flow speeds through pipes of the same diameter. The sewage, about 99% of the effluent, flows through the sewage venturi chambers at about 50% of the original velocity. The sludge, which takes a much longer time to be digested (aerobically or anaerobically), has a flow velocity of about 10% of the original effluent. The flow velocity of the sludge is maintained by a gear pump located directly behind the drum separator.

The sludge then passes through a low pressure venturi that acts like a carburetor with the air (preferably pure oxygen) being dissolved in the sludge. This serves to satisfy the biological oxygen demand (B.O.D.) of the aerobic bacteria. The sludge is now termed "activated." After the sludge has been "activated" it enters the high pressure venturi.

This high pressure venturi serves as an environment for the aerobic bacteria by decreasing the flow rate. This flow rate is so slow that the aerobic bacteria that are in this venturi digest their way toward the inflowing sludge at the same rate as it flows in. As a result, the point of maximum bacterial action is always at the same place in the venturi. There is also an emergency centrifugal pump on the under side of this venturi. The purpose of this pump is to recirculate seed sludge to the low pressure venturi; if and as the situation dictates.

Also, on the underside of this venturi is an air (oxygen preferred) injection system; to add oxygen if a situation arises in which the low pressure venturi is unable to meet most or all of the B.O.D. There is on the top of this high pressure venturi a gas vent for any unabsorbed (undissolved) gases.

After the sludge flows out of this high pressure venturi, it flows through a low pressure venturi which removes most or all of the unused oxygen. The partly digested sludge then enters another high pressure venturi. In this venturi there is a (are) gas vent(s) and emergency recirculating sludge seed pump, but no air injection system. This high pressure venturi forms the environment for the anaerobic bacteria. The gas vent(s) in this venturi is (are) used to remove the high quality combustible gas that formed as a result of the anaerobic bacterial action. The flow rate in this venturi meets the specifications as the one stated in the preceeding paragraph.

Like the previously mentioned high pressure venturi, the point of maximum bacterial action is at the same (i.e. constant) point in the venturi. After the sludge has flowed through at least once in the series of events described above, it is then dewatered (dried) by a second high speed flow-powered drum separator. The sewage then goes back to join the sewage separated by the first drum separator to undergo its own digestion.

The sludge is then gear pumped into an incinerator. This is designed to burn the sludge with or without air (oxygen) and/or water. The incinerator is therefore equipped with two injection systems, one for water and the other for air (preferably oxygen). There is also a vacuum gas vent for any of the gases that are produced in the incinerator. The gases may be combustible or incombustible. If they are combustible, such as those from the anaerobic digester (high pressure sludge venturi) the gases may then be sold.

The heat given off by the incinerator is transferred by heating coils to the high pressure venturis. The heat is also used to dry the incoming sludge in the case of a non-water reaction. The incinerator itself is a straight iron (preferably stainless steel) pipe. At the end of the incinerator is a gear pump that is used to maintain a vacuum or high pressure in the incinerator depending on the reaction. All the grit that was initially taken out of the effluent is passed through the incinerator with the sludge. The sludge has now been completely processed and the ash is sold as top soil or compost.

The sewage flows through a separate series of high and low pressure venturis. First the sewage flows through a low pressure venturi aerator (which acts like a carburetor to dissolve air into sewage). The sewage then flows into a high pressure venturi, the width and length of which is larger than the high pressure venturis used in the sludge line. This is because the sewage has a greater flow velocity; and to have a suitable detention time in the venturi, it has to be larger. The high pressure venturi has a gas vent for all of the undissolved air (oxygen.) The purpose of this pair of low and high pressure venturis is for the aerobic bacteria to digest the sludge that the drum separator did not remove from the sewage.

The sewage then moves into a second low pressure venturi (carburetor) and next into a high pressure venturi that is filled with sand to provide an anchor for the nitrite bacteria. The nitrite bacteria breaks down the ammonia in the sewage into nitrite(s). The sewage then passes through a short high pressure venturi that is filled with charcoal to filter the sewage. Both high and low pressure venturis are equipped with injector systems and vent systems.

The sewage then passes through two more identical series of venturis, the only difference being in the type of bacteria that are in the sand. In the first there are nitrate bacteria, that convert the nitrite(s) into nitrates. In the second there are denitrifying bacteria that liberate the nitrogen from the nitrates. The nitrogen is removed from the venturi by the non-combustible gas vent. There is one more additional charcoal filter. The sewage is now usable water.

EMBODIMENT OF PROCESS

In the use of this process it is recommended that it be implimented in pairs and each half normally operating at about 47% of its maximum capacity. The two halves have bridges between them at various intervals in the process. The purpose of this is to isolate any damaged parts so that maintenance can be done while the process is still operating close to its maximum efficiency. There are to be a minimum of two bridges, one for the sludge and the other for the sewage.

The following is an example of the placement of these bridges. The sludge bridge is placed directly after the gear pump of the second drum separator and joining the two incinerators. The sewage bridge is to be placed so as to join the sewage (liquid effluent) of the first drum separator of both systems. There are also two gate valves at the point of division of the effluent into two flows (one for each system).

All bridges have gate valves which are to remain closed when the bridge is not in use. The bridges are constructed in a similar fashion to the venturis (i.e. reinforced vacuum-dried concrete.)

I do hereby claim the following:

1. A process for treating sewage effluent comprising:
 (a) removing grit from the sewage effluent:
 (b) passing the effluent to a drum separator and separating the effluent into a sludge fraction and a sewage fraction;
 (c) passing the sludge fraction through a low pressure venturi and adding oxygen to produce an activated sludge;
 (d) passing the activated sludge through a high pressure venturi for aerobic digestion;
 (e) passing the sludge from (d) through a low pressure venturi to remove excess oxygen;
 (f) passing the sludge from (e) through a high pressure venturi for anaerobic digestion;
 (g) removing the combustible gas formed in (f);
 (h) dewatering the sludge from (f) by means of a drum separator into a sludge fraction and a sewage fraction;
 (i) incinerating the grit from (a) and the sludge fraction from (h);
 (j) passing the sewage from (b) and the sewage from (h) into a low pressure venturi aerator, a high pressure venturi aerator, and a second low pressure venturi aerator;
 (k) passing the sewage from (j) into a high pressure venturi filled with sand which contains nitrite bacteria to break down ammonia in the sewage into nitrites;
 (l) passing the sewage from (k) into a short high pressure verturi filled with charcoal;
 (m) passing the sewage from (l) into a high pressure venturi filled with sand which contains nitrate bacteria to convert nitrites into nitrates;
 (n) passing the sewage from (m) into a high pressure venturi filled with sand which contains denitrifying bacteria to liberate nitrogen from the nitrates, and venting the nitrogen;
 (o) passing the sewage from (n) through an additional charcoal filter to produce usable water.

* * * * *